US006731037B1

(12) United States Patent
Kim et al.

(10) Patent No.: US 6,731,037 B1
(45) Date of Patent: May 4, 2004

(54) HOUSING ASSEMBLY STRUCTURE OF STARTER MOTOR FOR VEHICLE

(75) Inventors: Soo-Sin Kim, Kyongju-si (KR); Sang-Hyuk An, Kyongju-si (KR); Jong-In Lee, Kyongju-si (KR); Byung-Chan Seo, Kyongju-si (KR); Jae-Cheol Lee, Kyongju-si (KR)

(73) Assignee: Valeo Mando Electrical Systems, Kyongsangbuk-do (KR)

( * ) Notice: Subject to any disclaimer, the term of this patent is extended or adjusted under 35 U.S.C. 154(b) by 0 days.

(21) Appl. No.: 10/455,265

(22) Filed: Jun. 5, 2003

(30) Foreign Application Priority Data

Apr. 30, 2003 (KR) ................................ 10-2003-0027518

(51) Int. Cl.⁷ .................................................. H02K 5/00

(52) U.S. Cl. ............................ 310/89; 310/42; 74/7 A; 290/48

(58) Field of Search ............................ 310/89, 42, 88, 310/67 R; 74/6, 7 R, 7 A, 7 B; 29/428, 456; 290/46–48, 10, 22–38 E

(56) References Cited

U.S. PATENT DOCUMENTS

| | | | | |
|---|---|---|---|---|
| 4,382,200 A | * | 5/1983 | Street | 310/157 |
| 4,663,979 A | * | 5/1987 | VanSickle | 74/7 A |
| 4,869,626 A | * | 9/1989 | Kosmowski | 408/129 |
| 5,134,330 A | * | 7/1992 | Haas et al. | 310/83 |
| 5,353,658 A | * | 10/1994 | Nagashima et al. | 74/7 A |
| 5,481,148 A | * | 1/1996 | Moribayashi et al. | 310/154.16 |
| 5,644,171 A | * | 7/1997 | Yumiyama et al. | 290/48 |
| 5,982,059 A | * | 11/1999 | Anderson | 310/50 |
| 6,134,977 A | * | 10/2000 | Wessels | 74/7 A |

* cited by examiner

*Primary Examiner*—Dang Lee
(74) *Attorney, Agent, or Firm*—R. Neil Sudol; Henry D. Coleman; William J. Sapone

(57) ABSTRACT

The present invention relates to a housing assembly structure of a starter motor for a vehicle which is capable of implementing an easier assembling operation of a magnet switch and a lever in a finished assembling line of a starter motor based on a shape change of a housing in a housing with a magnet switch which is attached to a front bracket of a starter motor for thereby operating a lever and decreasing a fabrication cost of a product. There is provided a housing engaging structure of a starter motor for a vehicle in which in order to implement an easier assembling operation without any interference with respect to the hook and the flange portion when the housing having the magnet switch is engaged to the front bracket, the housing is formed in a cylindrical shape and has a female threaded portion in an inner diameter of an end portion of the same, and a male threaded portion is formed in an outer surface of the flange portion of the front bracket to which the housing is engaged, and both the threaded portions are engaged each other.

4 Claims, 6 Drawing Sheets

【Fig.1】 Prior Art
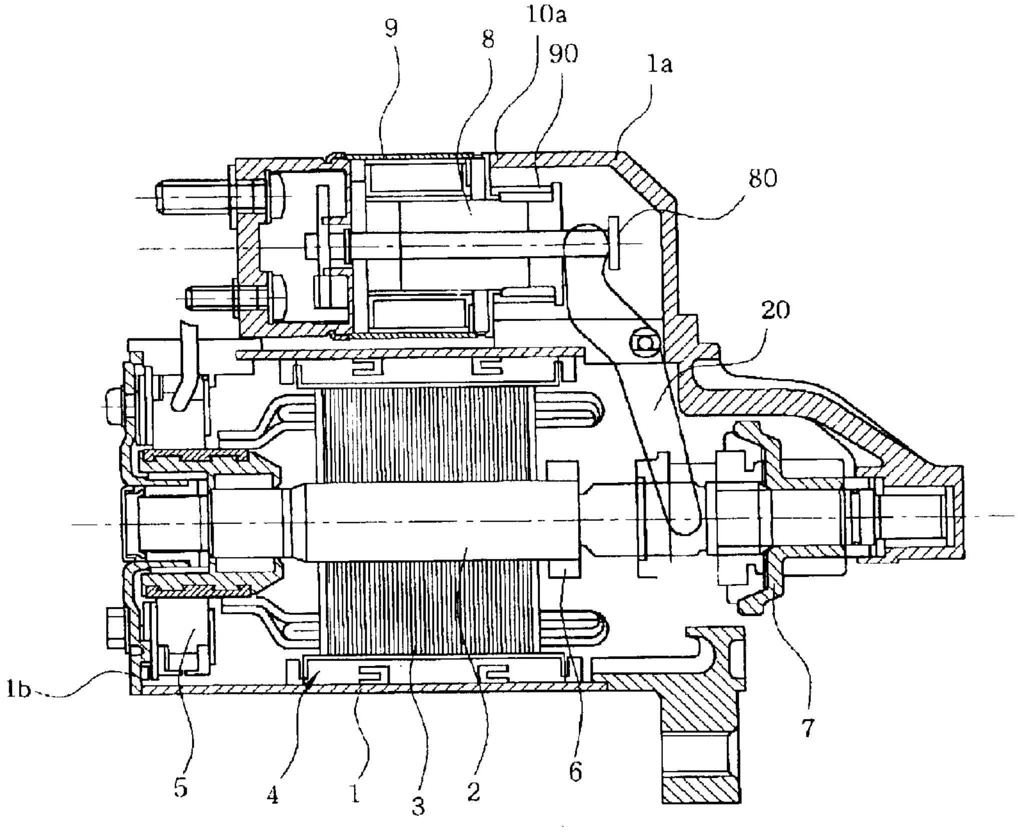

【Fig.2】 Prior Art
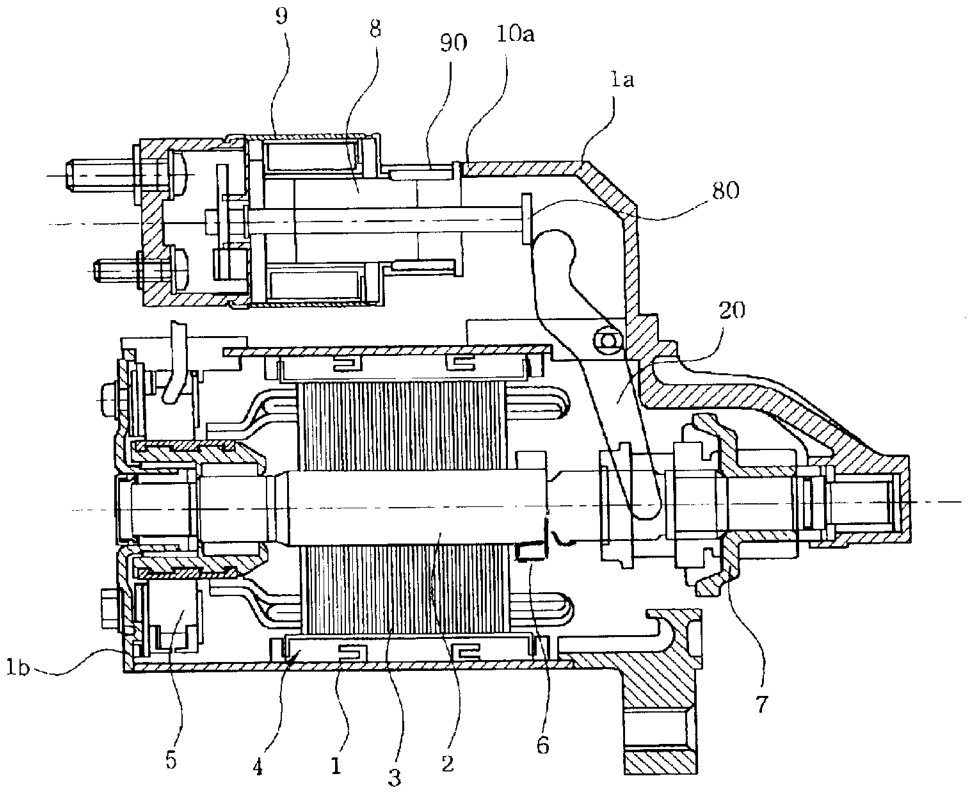

【Fig.3a】
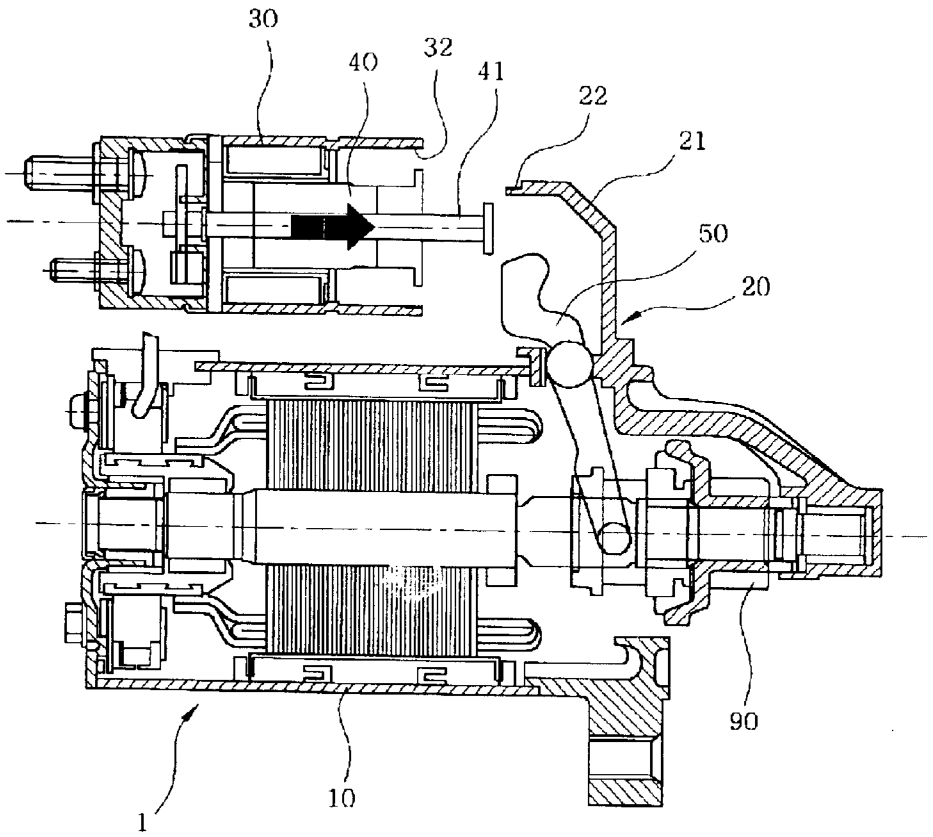

【Fig.3b】
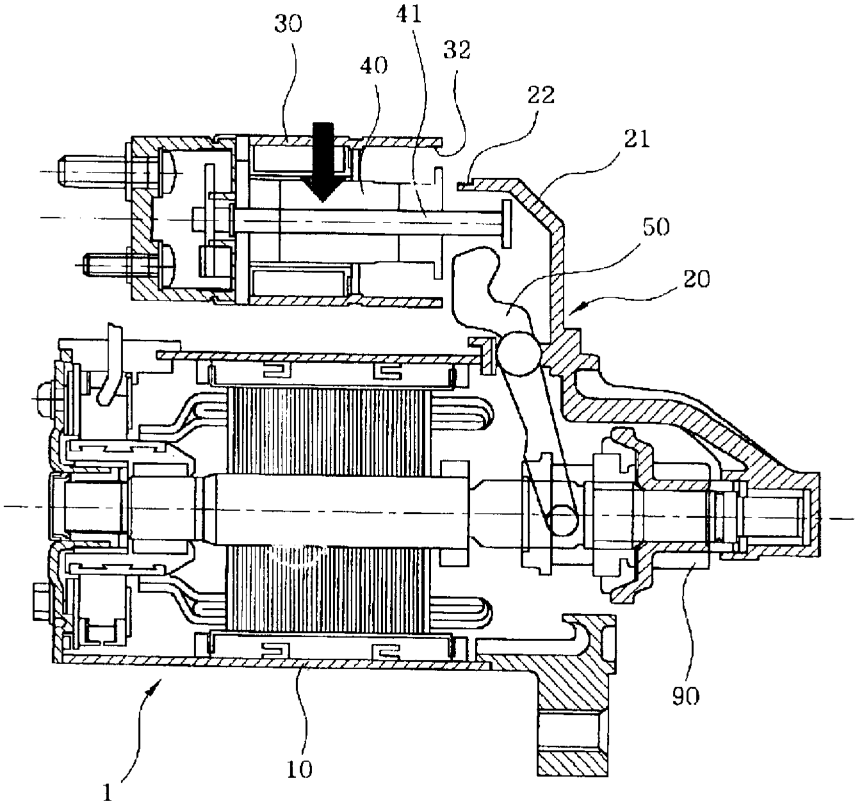

【Fig.4】
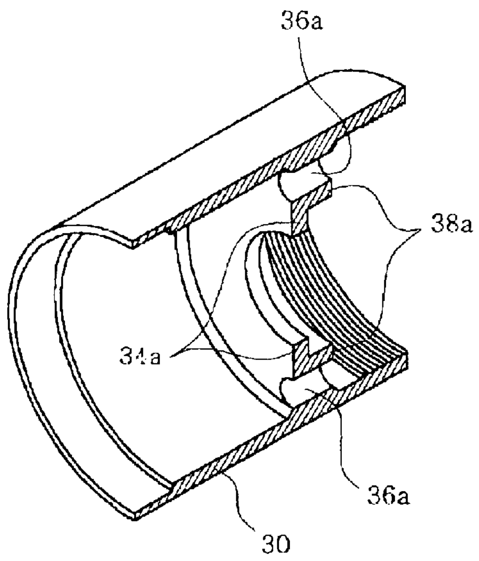
【Fig.5】
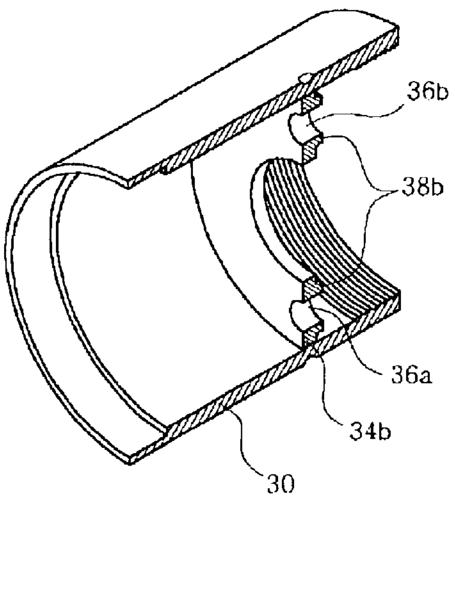

【Fig.6】
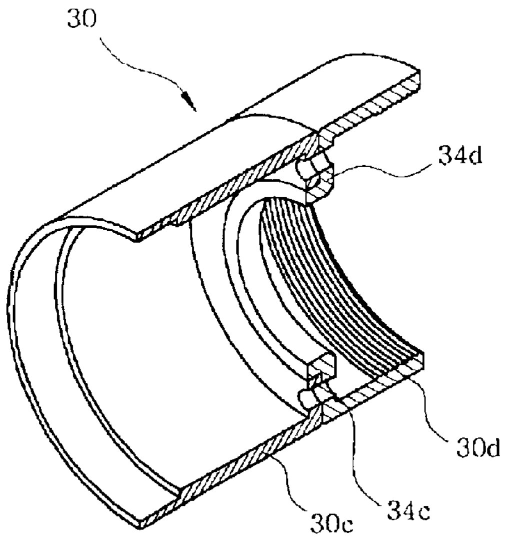

HOUSING ASSEMBLY STRUCTURE OF STARTER MOTOR FOR VEHICLE

BACKGROUND OF THE INVENTION

1. Field of the Invention

The present invention relates to a housing assembly structure of a starter motor for a vehicle, in particular, a housing assembly structure of a starter motor for a vehicle which is capable of decreasing a fabrication cost by implementing an assembling of a magnet switch and a lever in a finished assembling line of a starter motor based on a shape change of a housing in which a magnet switch attached to a front bracket of a starter motor and operating a level is installed, preventing a decrease of an engaging force due to a vibration of a motor by engaging a front bracket and a housing using an engaging screw and enhancing a durability and reliability of a product.

2. Description of the Background Art

Generally, as shown in FIG. 1, a conventional starter motor includes a front bracket 1*a*, a yoke 1, an armature assembly 3 engaged to a shaft 2 in the interior of a rear bracket 1*b*, a stator 4 which is fixed in an inner surface of the yoke 1 in a surrounding of the armature assembly 3, a brush assembly 5 for supplying a power to the armature assembly, an internal gear assembly 6 connected with a front end of the shaft 2, and an over running clutch 7 connected with the internal gear assembly 6 for transferring a driving force to a pinion.

In addition, a housing 9 in which a magnet switch 8 having a hook 80 which reciprocates based on an electric operation is provided in an upper front bracket 1*a* of the starter motor 1, and a lever 20 which moves the pinion for starting an engine is provided in a front portion of the magnet switch 8 and is interworks with the hook 80 of the magnet switch 8.

The process for engaging the housing 9 with the magnet switch 8 to the front bracket 1*a* of the motor may be classified into two types.

First, the lever is first inserted into the front bracket, and then the magnet switch is engaged. In this method, the housing including the magnet switch is engaged to the front bracket, and the end portion of the hook of the magnet switch is engaged to the end portion of the inserted lever. Second, in a state that the hook of the magnet switch is first engaged to the lever, the magnet switch housing is fixed to the front bracket using a bolt or a clamping method.

However, in the case of the structure in which the housing is assembled in the above manner, it is possible to easily insert the hook of the magnet switch into the level. However, as shown in FIG. 2, a step portion 90 is formed in the front side of the housing 9 for an engagement with the front bracket 1*a*, when the hook 80 of the magnet switch is assembled to the lever 20, the front end of the magnet switch housing 9 may be interfered by a plunger portion 10*a* of the front bracket 1*a*, so that the front end of the hook 80 may be caught by the lever 20, whereby it is impossible to effectively engage the housing 9.

In addition, when the housing is engaged in the above manner, in a state that the lever 20 is engaged to the magnet switch hook 80, since the magnet switch housing 9 must be engaged to the front bracket 1*a*, the number of processes is increased, so that the fabrication cost is increased, and the. construction of the system is complicated.

In a state that the housing is operatively assembled to the front bracket, in order to fix the same, the engagement is implemented using a bolt or clamping member. Here, in the case of using a bolt, a plurality of bolts are engaged step by step, so that it is impossible to implement a desired mass production of the product. In addition, in the case of using a clamping member, the bolts are not needed, so that it is advantages in a view of the mass production and cost, but an electrical resistance due to a durability and motor vibration of a product are high, the reliability of the product is decreased.

SUMMARY OF THE INVENTION

Accordingly, it is an object of the present invention to provide a housing assembly structure of a starter motor for a vehicle which overcomes the problems encountered in the conventional art.

It is another object of the present invention to provide a housing assembly structure of a starter motor for a vehicle which is capable of implementing an easier assembling operation of a magnet switch and a lever in a finished assembling line of a starter motor based on a shape change of a housing in a housing with a magnet switch which is attached to a front bracket of a starter motor for thereby operating a lever and decreasing a fabrication cost of a product. In addition, it is possible to increase a desired mass production of a product by enhancing an assembling ability of a product by forming a threaded portion in an inner portion of a housing and an outer diameter portion of a flange portion of a front bracket. In addition, it is possible to enhance a durability and reliability of a product by preventing a decrease of an engaging force due to a vibration of a motor.

To achieve the above objects, In a starter motor for a vehicle in which a housing is engaged in a flange portion of a front bracket of an upper side of a yoke of a starter motor, a magnet switch which includes a hook reciprocating based on an electrical operation is installed in the housing, and a lever which moves a pinion for starting an engine is installed in a front portion of the magnet switch and operatively interworks with a hook of the magnet switch, there is provided a housing assembly structure of a starter motor for a vehicle in which in order to implement an easier assembling operation without any interference with respect to the hook and the flange portion when the housing having the magnet switch is engaged to the front bracket, the housing is formed in a cylindrical shape and has a female threaded portion in an inner surface of an end portion of the same, and a male threaded portion is formed in an outer surface of the flange portion of the front bracket to which the housing is engaged, and both the threaded portions are engaged each other.

BRIEF DESCRIPTION OF THE DRAWINGS

The present invention will become better understood with reference to the accompanying drawings which are given only by way of illustration and thus are not limitative of the present invention, wherein;

FIG. 1 is a cross sectional view illustrating the construction of a conventional starter motor;

FIG. 2 is a cross sectional view illustrating a housing engaging state of a conventional starter motor;

FIGS. 3A and 3B are cross sectional views illustrating a separation and engaging state of a housing of a starter motor for a vehicle according to the present invention;

FIG. 4 is a view illustrating a starter motor housing according to a first embodiment of the present invention;

FIG. 5 is a view illustrating a starter motor housing according to a first embodiment of the present invention; and FIG. 6 is a view illustrating a starter motor housing according to a first embodiment of the present invention.

DETAILED DESCRIPTION OF THE PREFERRED EMBODIMENTS

The preferred embodiments of the present invention will be described with reference to the accompanying drawings.

The same elements as the conventional construction are given the same reference numerals, and the detailed descriptions of the same will be omitted.

FIGS. 3A and 3B are cross sectional views illustrating a separation and engaging state of a housing of a starter motor for a vehicle according to the present invention, FIG. 4 is a view illustrating a starter motor housing according to a first embodiment of the present invention, FIG. 5 is a view illustrating a starter motor housing according to a first embodiment of the present invention, and FIG. 6 is a view illustrating a starter motor housing according to a first embodiment of the present invention.

As shown therein, the entire construction of the starter motor according to the present invention will be described with reference to FIG. 3A. A housing 30 with a magnet switch 40 therein is installed in a front bracket 20 of an upper portion of a yoke 10 of a starter motor. A hook 41 which reciprocates based on an electrical operation is installed in the magnet switch 40 of the housing 30.

In addition, a lever 50 which moves a pinion forwardly and backwardly for starting an engine is provided in the housing and interworks with the hook 41 of the magnet switch 40.

The present invention particularly relates to the structure of engaging the housing 30 to the front bracket 20. In order to implement an easier assembling without any interference of the hook 41 and the flange portion 21 when the housing 30 with the magnet switch is engaged to the front bracket, the housing 30 is formed in a cylindrical shape and has a female threaded portion 32 in an inner diameter portion of an end of the same, and a male threaded portion 22 is formed in an outer surface of the flange portion 21 of the front bracket 20, so that both the threaded portions 32 and 22 are engaged.

Here, as shown in FIG. 4 of the first embodiment of the present invention, the housing 30 includes an integral partition wall 34*a* for supporting the magnets switch 40 in the center portion of the housing, and a bolt engaging hole 36*a* is formed in the partition wall 34*a* for fixing a magnet core using a bolt, etc. for implementing an operation of the magnet switch. A boss portion 38*a* is protruded for obtaining a sufficient engaging length of the bolt.

As shown in FIG. 5 of the second embodiment of the present invention, the housing 30 is fixed based on a caulking work in an outer portion of the housing 30 with an insertion of the partition wall 34*b* for supporting the magnet switch in the center portion. The partition wall 34*b* includes a bolt engaging hole 36*b* which is formed through a burring work for fixing the magnet core for implementing an operation of a magnet switch.

As shown in FIG. 6 of the third embodiment of the present invention, the adapter 30*d* and the magnet housing 30*c* are The structure of claim 1, wherein said housing is divided into an adapter and a magnet housing about the partition walls in the center portion, and the partition walls are engaged each other based on a heat-treat tight insertion engaging method.

Therefore, the housing of the starter motor for a vehicle according to the present invention is assembled in the following manners.

As shown in FIGS. 3A and 3B, the housing 30 according to the present invention is engaged to the flange portion 21 extended from the front bracket 20 of the upper side of the assembled staffer motor body 1. As shown in FIG. 3*a*, the lever 50 operating the pinion 90 is assembled in the front bracket 20 of the body 1 of the starter motor.

Here, when engaging the housing 30 having the magnet switch 40 to the flange portion 21 of the front bracket 20, the housing 30 is engaged to the flange portion 21 and the hook 41 of the magnet switch 40 is operatively engaged with the lever 50 without any interference with each other. In particular, since the housing 30 is formed in a cylindrical shape, as shown in FIG. 3*a*, it is possible to insert the hook 41 of the magnet switch 40 between an inner side of the flange portion 21 of the front bracket 20 and an end portion of the operation lever 50.

As shown in FIG. 3*b*, when moving down the housing 30 having the magnet switch 40, it is possible to implement an engagement between the hook 41 of the magnet switch 40 and the lever 50 without any interference. In this state, the threaded portions 32 and 22 formed in the inner diameter portion of the end portion of the housing 30 and in the outer surface of the end portion of the flange portion 20 are engaged, so that it is possible to simply engage the magnet switch housing 30 to the front bracket 20.

Therefore, in the engaging structure of the housing of the starter motor for a vehicle according to the present invention, it is possible to implement an easier assembling of the hook 41 and the lever 50 of the magnet switch in a finishing line for assembly of the starter motor based on a shape transformation of the housing 20, so that a fabrication cost of a product is decreased.

In addition, the housing and the front bracket 20 are engaged through a threading method, an engaging force is increased, and it is possible to minimize an electrical resistance due to a vibration of the motor.

As shown in FIG. 4, the housing 30 includes an integrally-formed partition wall 34*a* for supporting the magnet switch 40 in the inner center portion. A magnet core is fixed to the partition wall 34*a* using a bolt for implementing a magnet switch operation. A boss portion 38*a* is protruded from the engaging hole 36*a* formed in the partition wall 34*a* for fixing the magnet core. Therefore, it is possible to provide a sufficient length of the bolt, so that a supporting force of the magnet core is increased.

As shown in FIG. 5, the magnet switch housing 30 may be fixed based on a cocking work in an outer portion of the housing in insertion with the partition wall 34*b* therein for supporting the magnet switch 40 in the inner center portion. In addition, the bolt engaging hole 36*b* which is processed by a burring 38*b* work for fixing the magnet core which is provided for an operation of the magnet switch is formed in the partition wall 34*b*. Therefore, it is possible to implement a sufficient engaging distance of the bolt, so that a supporting force that the magnet core is fixedly attached to the partition wall is increased.

In addition, as shown in FIG. 6 of the third embodiment of the present invention, the adapter 30*d* and the magnet housing 30*c* are separated with the partition walls 34*c*, and 34*d*, so that it is possible to implement a tight heat insertion engagement between the partition walls 34*c* and 34*d*. Therefore, it is possible to implement the same effects.

As described above, in the housing engaging structure of the starter motor for a vehicle according to the present invention, it is possible to implement an easier assembling of the magnet switch and the lever in a finished assembling line of the starter motor through a shape transformation of the housing, so that it is possible to decrease a product fabrication cost. In addition, since the threaded portions are formed in the inner diameter of the housing and the outer diameter of the flange portion of the front bracket and are engaged each other, so that it is possible to increase a mass production through an improved assembling ability of the products and to prevent a decrease of the engaging force due to the vibration of the motor, for thereby increasing a durability and reliability of the product. In addition, it is possible to minimize an electrical resistance due to the vibration of the motor.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a starter motor for a vehicle in which a housing is engaged in a flange portion of a front bracket of an upper side of a yoke of a starter motor, a magnet switch which includes a hook reciprocating based on an electrical operation is installed in the housing, and a lever which moves a pinion for starting an engine is installed in a front portion of the magnet switch and operatively interworks with a hook of the magnet switch, a housing assembly structure of a starter motor for a vehicle in which in order to implement an easier assembling operation without any interference with respect to the hook and the flange portion when the housing having the magnet switch is engaged to the front bracket, the housing is formed in a cylindrical shape and has a female threaded portion in an inner surface of an end portion of the same, and a male threaded portion is formed in an outer surface of the flange portion of the front bracket to which the housing is engaged, and both the threaded portions are engaged each other.

2. The structure of claim 1, wherein said housing includes an integrally-formed partition wall for supporting the magnet switch in an inner center portion, and a bolt engaging hole is formed in the partition wall for fixing the magnet core using a bolt, etc. for implementing an operation of the magnet switch, and a boss portion is protruded from the bolt engaging hole for providing a sufficient engaging length of the bolt.

3. The structure of claim 1, wherein said housing is fixed through caulking work in an outer side of the housing with the partition wall inserted therein in the inner center portion for supporting the magnet switch, and a bolt engaging hole which is formed through burring for fixing a magnet core for implementing an operation of the magnet switch is formed in the partition wall.

4. The structure of claim 1, wherein said housing is divided into an adapter and a magnet housing about the partition walls in the center portion, and the partition walls are engaged each other based on a heat-treat light insertion engaging method.

* * * * *